(12) United States Patent
Lee et al.

(10) Patent No.: US 12,094,099 B2
(45) Date of Patent: Sep. 17, 2024

(54) METHOD FOR VERIFYING DETECTION ABILITY OF AUTOMATIC OPTICAL INSPECTION AND DISPLAY PANEL INCLUDING INSPECTION ELEMENT GROUP USED THEREFOR

(71) Applicant: Samsung Display Co., LTD., Yongin-si (KR)

(72) Inventors: Yu Jin Lee, Cheonan-si (KR); Yul Kyu Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 619 days.

(21) Appl. No.: 17/344,151

(22) Filed: Jun. 10, 2021

(65) Prior Publication Data

US 2022/0156912 A1     May 19, 2022

(30) Foreign Application Priority Data

Nov. 19, 2020   (KR) .......................... 10-2020-0155672

(51) Int. Cl.
*G06T 7/00*         (2017.01)
*G06T 7/70*         (2017.01)

(52) U.S. Cl.
CPC .............. *G06T 7/0004* (2013.01); *G06T 7/70* (2017.01); *G06T 2207/30121* (2013.01)

(58) Field of Classification Search
CPC ..................... G06T 7/0004; G06T 2207/30121
USPC ........................................................... 349/152
See application file for complete search history.

(56) References Cited

U.S. PATENT DOCUMENTS

2021/0065646 A1*   3/2021   Lv ........................ G09G 3/3677

FOREIGN PATENT DOCUMENTS

| JP | 2006215224 A | 8/2006 |
| KR | 1020050088416 A | 9/2005 |
| KR | 101450796 B1 | 10/2014 |
| KR | 1020150039456 A | 4/2015 |
| KR | 101908134 B1 | 10/2018 |

* cited by examiner

*Primary Examiner* — Christopher M Raabe
(74) *Attorney, Agent, or Firm* — CANTOR COLBURN LLP (57) ABSTRACT

A display panel includes a substrate including a display area in which elements used for display are disposed and a peripheral area, and an inspection element group disposed in the peripheral area of the substrate, where the inspection element group includes defects that are repeatedly disposed.

9 Claims, 9 Drawing Sheets

METHOD FOR VERIFYING DETECTION ABILITY OF AUTOMATIC OPTICAL INSPECTION AND DISPLAY PANEL INCLUDING INSPECTION ELEMENT GROUP USED THEREFOR

This application claims priority to Korean Patent Application No. 10-2020-0155672 filed on Nov. 19, 2020, and all the benefits accruing therefrom under 35 U.S.C. § 119, the content of which in its entirety is herein incorporated by reference.

BACKGROUND

(a) Field

The present disclosure relates to a method for verifying detection ability of an automatic optical inspection and a display panel including an inspection element group used therefor, and more specifically, to a method for verifying detection ability of an automatic optical inspection and a display panel including an inspection element group used therefor that may verify detection ability of an automatic optical inspection that optically inspects whether each pattern layer is normal when manufacturing a display panel.

(b) Description of the Related Art

To manufacture a flat panel display device such as a liquid crystal display ("LCD"), an organic light emitting diode ("OLED") display, and a quantum dot ("QD") display, multiple layers of conductive layer patterns, insulation film patterns, and semiconductor film patterns may be formed on a substrate. Each pattern layer is formed through a method such as photolithography, and in this case, a size of the pattern is very fine, so that defects may occur during a formation process thereof, thus it is desirable to quickly filter out defects by inspecting for defects. For this, an automatic optical inspection method is used.

The automatic optical inspection method is a method that detects an inspection pattern by irradiating light on a pattern layer and detecting the reflected light with a sensor, and detects the defective area by comparing repeated patterns with each other to check a gray difference therebetween. This automatic optical inspection method has a merit that it may quickly inspect the presence or absence of defects, but when there is a problem with performance or condition of inspection equipment and thus defect-detecting ability is degraded, a problem (non-inspection) of not detecting any defects, a problem (low inspection) of detecting only some of defects, or a problem (distortion of coordinates) of misrecognition of bad location due to incorrect alignment between inspection equipment and a panel to be inspected, may occur.

SUMMARY

Embodiments are to solve this problem and improve reliability of an automatic optical inspection.

An embodiment provides a display panel including a substrate including a display area in which elements used for display are disposed and a peripheral area, and an inspection element group disposed in the peripheral area of the substrate, where the inspection element group includes defects that are repeatedly disposed.

The inspection element group may be disposed in an area in which a sealant of the peripheral area is disposed, and the defect included in the inspection element group may include at least one of an island, an opening, a short circuit, and a pinhole.

The area in which the sealant may be disposed has a rectangular ring shape with four sides, and the inspection element group may be disposed on one or all of the four sides of the area in which the sealant is disposed.

The inspection element group may be a same pattern as an element formation pattern disposed in the display area except for additionally including the defect.

Another embodiment includes a method for verifying detection ability of an automatic optical inspection, including: forming a plurality display panel areas and an inspection element group, where the inspection element group includes a plurality of defects on a mother plate; performing an automatic optical inspection through an optical scan for the inspection element group; checking whether the plurality of defects included in the inspection element group are detected; and determining that the detection ability of the automatic optical inspection is sufficient when all the plurality of defects included in the inspection element group are detected.

The method for verifying the detection ability of the automatic optical inspection may further include determining that the detection ability of the automatic optical inspection is insufficient when at least one of the plurality of defects included in the inspection element group is not detected by the automatic optical inspection and/or checking whether detected positions of the plurality of defects included in the inspection element group are identical to designed positions of the plurality of defects.

The automatic optical inspection may be performed for the plurality of display panel areas only when all the plurality of defects included in the inspection element group are detected and the detected positions of the plurality of defects are identical to the designed positions of the plurality of defects.

The plurality of display panel areas may include a display area in which elements used for display are disposed and a peripheral area, the inspection element group may be disposed in the peripheral area, and the inspection element group may be disposed in an area in which a sealant of the peripheral area is disposed.

The defect included in the inspection element group may include an island, an opening, a short circuit, and a pinhole.

The inspection element group may be located at one end portion of the mother plate to be separated from the plurality of display panel areas.

According to the embodiment, it is possible to check defect-detecting ability of an automatic optical inspection at each step of forming each pattern layer of each panel. As such, by checking the defect-detecting ability in real time, it is possible to take immediate action when a problem occurs, and thus, it is possible to prevent yield reduction due to a problem of inspection equipment to improve productivity.

DETAILED DESCRIPTION

The present invention will be described more fully hereinafter with reference to the accompanying drawings, in which embodiments of the invention are shown. As those skilled in the art would realize, the described embodiments may be modified in various different ways, all without departing from the spirit or scope of the present.

In order to clearly describe the present invention, parts that are irrelevant to the description are omitted, and identical or similar constituent elements throughout the specification are denoted by the same reference numerals.

Further, in the drawings, the size and thickness of each element are arbitrarily illustrated for ease of description, and the present disclosure is not necessarily limited to those illustrated in the drawings. In the drawings, the thicknesses of layers, films, panels, regions, areas etc., are exaggerated for clarity. In the drawings, for ease of description, the thicknesses of some layers and areas are exaggerated.

It will be understood that when an element such as a layer, film, region, area or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "or" means "and/or." As used herein, the term "and/or" includes any and all combinations of one or more of the associated listed items.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Figure 1:
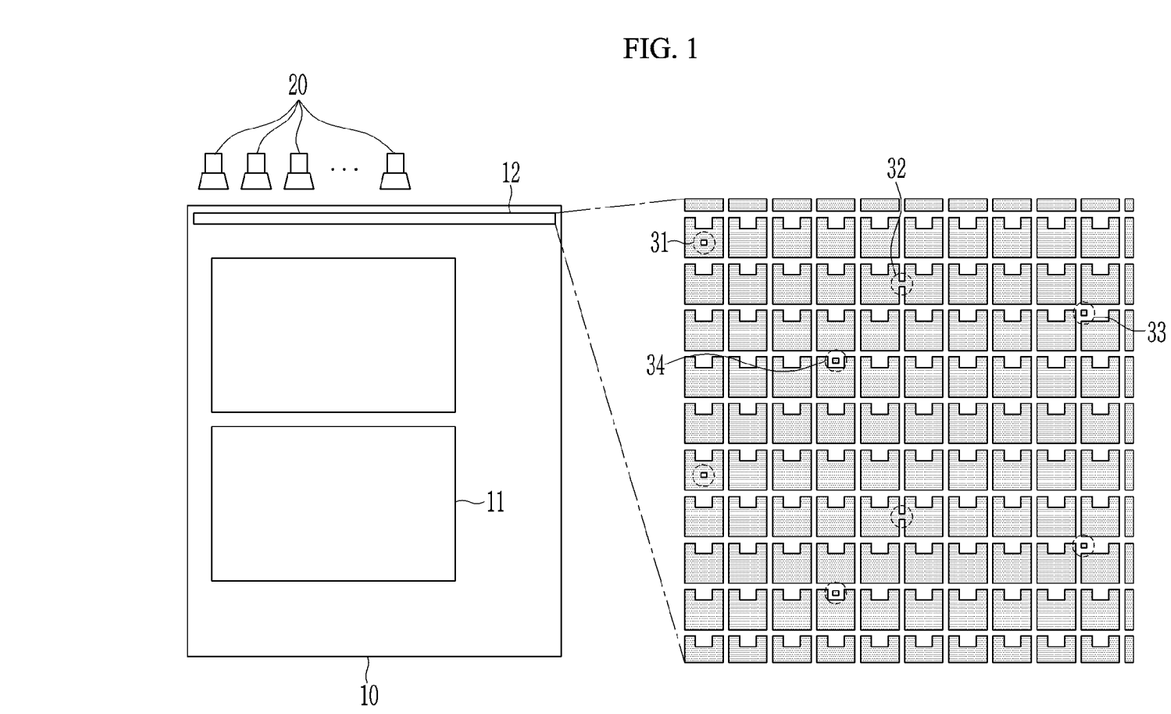
FIG. 1 illustrates a schematic view of a method for verifying detection ability of an automatic optical inspection according to an embodiment.

FIG. 1 illustrates a schematic view of a method for verifying detection ability of an automatic optical inspection according to an embodiment.

A method of manufacturing a flat panel display such as a liquid crystal display ("LCD"), an organic light emitting diode ("OLED") display, or a QD display device is generally as follows.

A plurality of display panel areas 11 is defined on one mother plate 10, and a plurality of thin film patterns is formed on each of the display panel areas 11 through a plurality of thin film formation processes such as deposition or coating and patterning processes such as though photolithography. FIG. 1 illustrates a case in which the display panel area 11 has a rectangular shape, but the display panel area 11 may have various shapes such as a circle, an ellipse, a polygon, or the like in addition to the rectangular shape. An automatic optical inspection is performed to inspect the presence or absence of defects for the thin film pattern formed in this way. Automatic optical inspection equipment includes an image detector including a light irradiator (not shown) and a plurality of cameras 20, and the light irradiator irradiates light to an object to be inspected, and the plurality of cameras 20 senses the reflected light to generate an image of a layer to be inspected. This process is performed by scanning the entirety of the mother plate 10 in a direction perpendicular to an arrangement direction of the camera 20 while the plurality of cameras 20 are arranged in a line. The scanning direction and the camera arrangement direction are parallel to a major surface plane of the mother plate 10.

In the embodiment, an inspection element group ("TEG") 12 may be formed at one end portion of the mother plate 10 in order to verify the detection ability of the automatic optical inspection. The inspection element group 12 may be formed at a position outside the display panel area 11, and may be formed in parallel with the arrangement direction of the cameras 20 of the inspection equipment. In an embodiment, the inspection element group 12 may be formed at each of the end portions of the mother plate 10.

Figure 8:
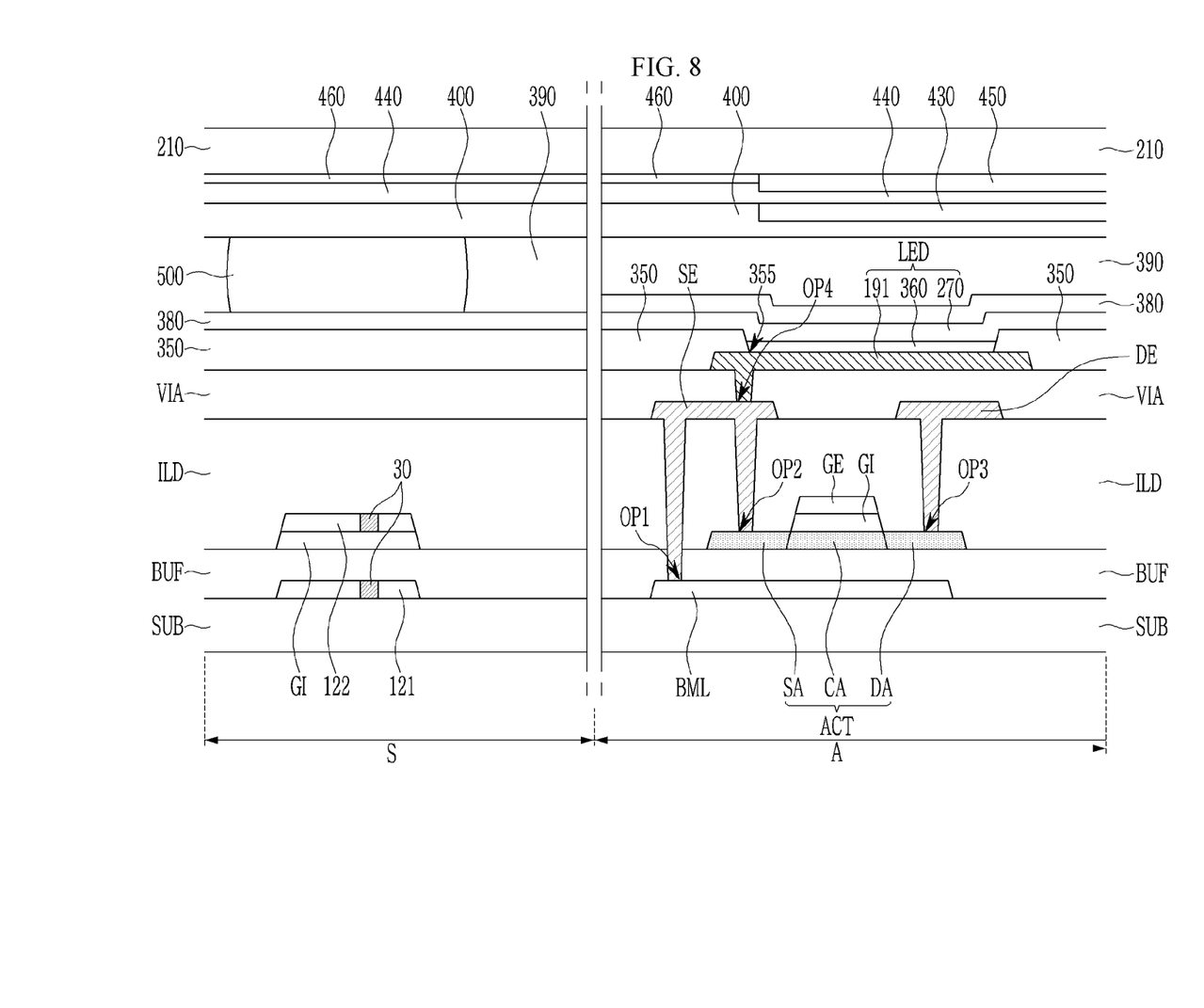
FIG. 8 illustrates a cross-sectional view of a display device manufactured by forming an inspection element group for verifying detection ability of an automatic optical inspection according to an embodiment in a sealing portion metal pattern.

The inspection element group 12, when an element for display (e.g., light emitting element, thin film pattern such as BML, GE in FIG. 8) is formed in the display panel area, may be formed together with the element, and may have a same or similar pattern to an element formation pattern (e.g., thin film pattern) that is formed in the display panel area. Defects 31, 32, 33, and 34 repeatedly formed are included in the patterns of the inspection element group 12. The defects 31, 32, 33, and 34 are various defect elements that may occur when a thin film pattern is formed, and typically may be islands 31, open portions 32, short circuits 33, and pinholes 34. The island 31 is a case in which an unnecessary island shape pattern is formed, the open portion 32 is a case in which a disconnection occurs, the short circuit 33 is a case in which a short circuit occurs, and the pinhole 34 is a case in which an unnecessary hole is formed in a pattern. In addition to these four defects, there may be various types of defects, and anything that may degrade element performance in the display panel area may be considered as defects. In the following description, only the four defects 31, 32, 33, and 34 will be described, but this is only an example, and the present disclosure may be applied to any defects. These defects 31, 32, 33, and 34 may be repeatedly formed, and may be formed in a plurality of sets with different sizes. In addition, the inspection element group 12 may include all defects or only some of the defects.

When the automatic optical inspection is performed on the mother plate 10 including the inspection element group 12, the automatic optical inspection equipment first inspects the inspection element group 12 through an optical scan, and in this case, it is possible to verify the detection ability and alignment state of the automatic optical inspection equipment, by checking whether the defects 31, 32, 33, and 34 included in the inspection element group 12 are all detected, and whether positions of the detected defects 31, 32, 33, and 34 match designed positions.

Instead of visually inspecting a product, the automatic optical inspection equipment captures an image of the product by using a scanner or camera, and compares it with master or digital data that is free from defects to verify whether there are no defects. When using this equipment, it is much faster and more accurate to check the presence and position of defects than a case of manually inspecting the product. The automatic optical inspection equipment may include the camera 20 (which may be replaced by a scanner), a light source (not shown) that irradiates light, and a controller (not shown, implemented by a microprocessor, etc.) that compares captured image data with master data to determine the presence or absence of a defect and a position of the defect. However, since there may be cases in which defects may not be identified due to various problems in an inspection environment, such as limitations in detection abilities such as a condition or resolution of the automatic optical inspection equipment, or alignment errors with a product to be inspected, in order to secure reliability of the inspection through the automatic optical inspection equipment, it is desirable to check the detection ability and alignment state in real time.

When all the defects 31, 32, 33, and 34 included in the inspection element group 12 are detected, and when the detected positions thereof are also identical to designed positions, it is determined that the detection ability of the automatic optical inspection equipment is sufficient and the alignment is normal, thus the automatic optical inspection may be performed on the display panel area.

As described above, it is possible to secure reliability of the automatic optical inspection by checking the detection ability and alignment state in real time during the automatic optical inspection, and when a problem occurs in the automatic optical inspection equipment, it is possible to prevent yield reduction and to improve productivity by immediately taking action.

As shown in FIG. 1, when the inspection element group 12 is formed in an area separated from the display panel area 11, by cutting each display panel area 11, in a state in which a final display panel is formed, the inspection element group 12 is removed to not remain. Alternatively, it is possible to dispose the inspection element group in an area of the display panel that does not contribute to display. Hereinafter, this embodiment will be described.

Figure 2:
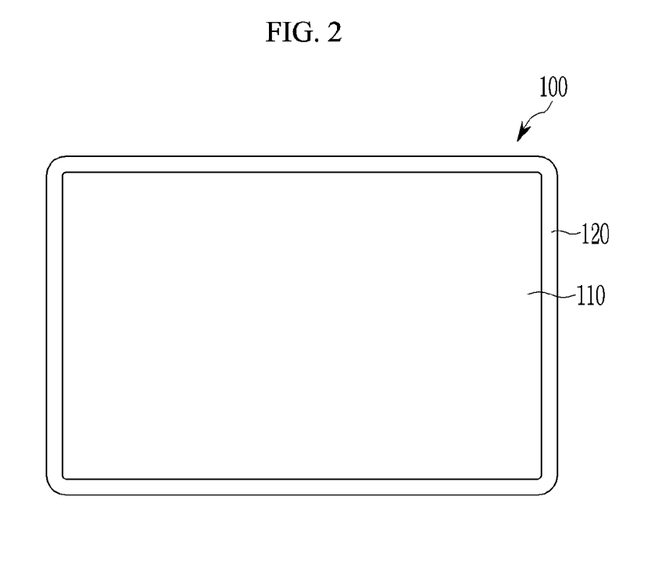
FIG. 2 illustrates a layout view of a display panel including an inspection element group used in a method for verifying detection ability of an automatic optical inspection according to an embodiment.
Figure 3:
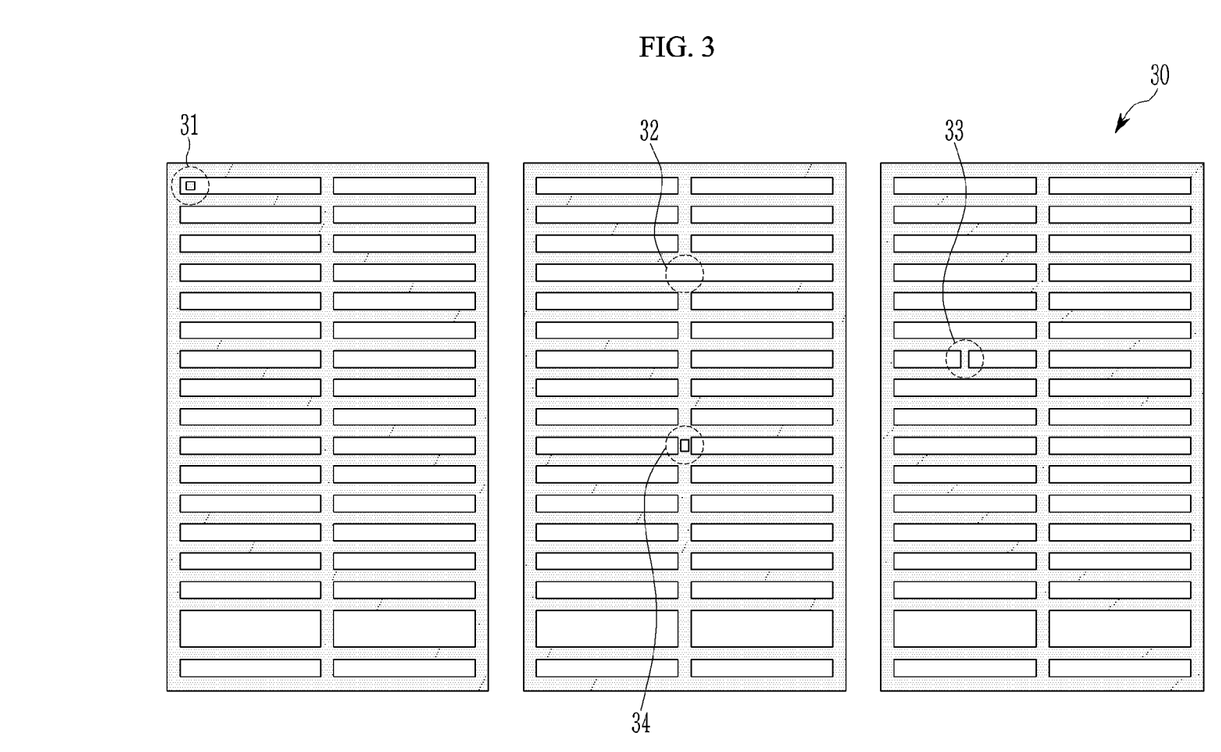
FIG. 3 illustrates a layout view of an inspection element group used in a method for verifying detection ability of an automatic optical inspection according to an embodiment.
Figure 4:
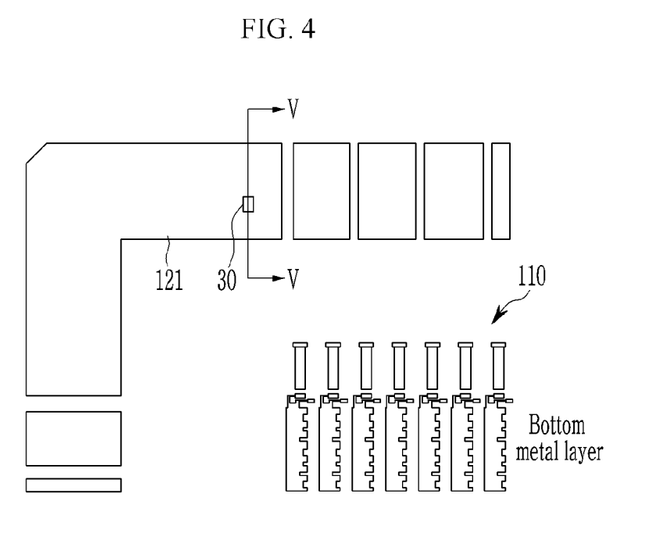
FIG. 4 illustrates an example of a bottom metal layer pattern, as a case of applying an inspection element group used in a method for verifying detection ability of an automatic optical inspection according to an embodiment to a sealing portion metal pattern.
Figure 5:
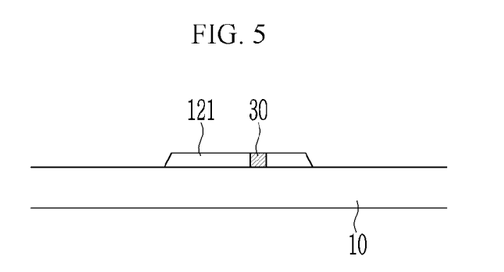
FIG. 5 illustrates a cross-sectional view taken along line V-V of FIG. 4.
Figure 6:
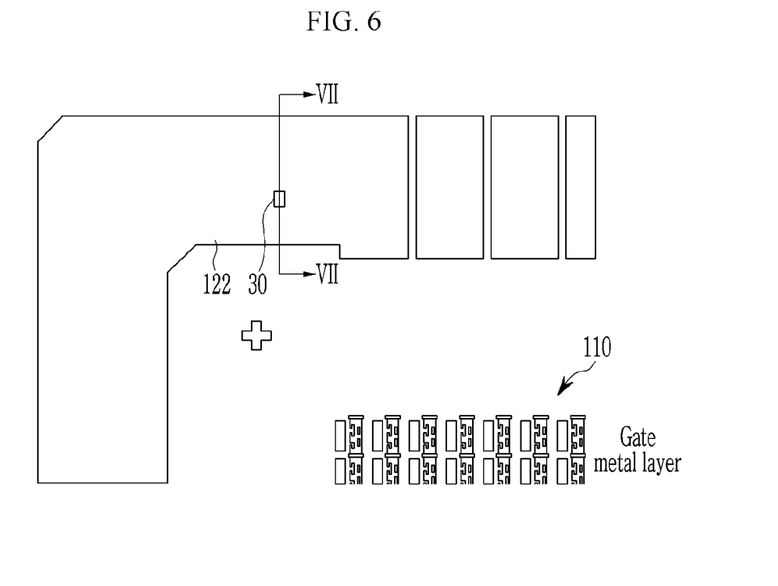
FIG. 6 illustrates an example of a gate metal layer pattern, as a case of applying an inspection element group used in a method for verifying detection ability of an automatic optical inspection according to an embodiment to a sealing portion metal pattern.
Figure 7:
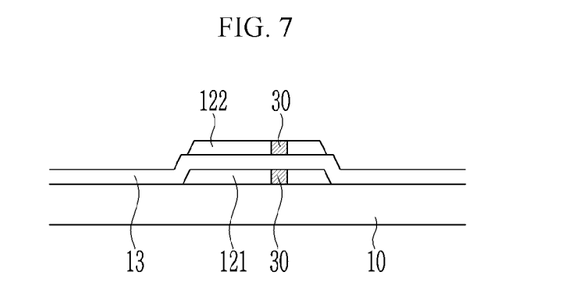
FIG. 7 illustrates a cross-sectional view taken along line VII-VII of FIG. 6.

FIG. 2 illustrates a layout view of a display panel including an inspection element group used in a method for verifying detection ability of an automatic optical inspection according to an embodiment. FIG. 3 illustrates a layout view of an inspection element group used in a method for verifying detection ability of an automatic optical inspection according to an embodiment. FIG. 4 illustrates an example of a bottom metal layer pattern, as a case of applying a test element group used in a method for verifying detection ability of an automatic optical inspection according to an embodiment to a sealing portion metal pattern, and FIG. 5 illustrates a cross-sectional view taken along line V-V of FIG. 4. FIG. 6 illustrates an example of a gate metal layer pattern, as a case of applying an inspection element group used in a method for verifying detection ability of an automatic optical inspection according to an embodiment to a sealing portion metal pattern, and FIG. 7 illustrates a cross-sectional view taken along line VII-VII of FIG. 6.

In the embodiment of FIG. 2, the inspection element group is disposed in a sealant formation area 120 of a display panel 100. A sealant is referred to as a wall formed on a display area edge for confining a liquid crystal between two substrates in a liquid crystal display, or for confining a filler between two substrates in an organic light emitting diode display or QD display device. The sealant may be made of a material such as a photo-curable or heat-curable resin. FIG. 2 illustrates the case in which the sealant formation area 120 has a substantially rectangular, ring shape surrounding a display area 100, but the sealant formation area 120 according to an embodiment may have various shapes such as a circle, an ellipse, and a polygon according to the shape of the display area. In order to improve adhesion of the sealant in the sealant formation area 120, when a bottom metal layer is formed in a display area 110, as shown in FIG. 4 and FIG. 7, a sealing portion bottom metal pattern 121 in the sealant formation area 120 is formed together with the bottom metal layer, and when a gate metal layer is formed, as shown in FIG. 6 and FIG. 7, a sealing portion gate metal pattern 122 in the sealant formation area 120 is formed together with the gate metal layer. The sealing portion bottom metal pattern 121 and the sealing portion gate metal pattern 122 may overlap each other with an insulation film 13 interposed therebetween. When an inspection element group 30 including the defects 31, 32, 33, and 34 is formed on the sealing portion metal patterns 121 and 122, as shown in FIG. 3, the automatic optical inspection equipment first inspects the sealing portion metal pattern 121 and 122, and in this case, by checking whether or not all the defects 31, 32, 33, and 34 included in the sealing portion metal patterns 121 and 122 are detected, and whether or not the detected positions of the detected defects 31, 32, 33, and 34 are identical to the designed positions, it is possible to verify the detection ability and alignment state of the automatic optical inspection equipment.

The inspection element group 30 including the defects 31, 32, 33, and 34 may be disposed in the entire sealing portion metal patterns 121 and 122, and alternatively, may be disposed in only a portion of the sealing portion metal patterns 121 and 122 disposed in a side of the display panel 100 where the cameras 20 first meet among all sides of the display panel 100, and the side extends in a direction (e.g., the camera arrangement direction) perpendicular to the inspection performing direction (e.g., the scanning direction). In another embodiment, the inspection element group 30 including the defects 31, 32, 33, and 34 may be disposed at a position outside the sealant formation area 120. Even in this case, by forming the sealing portion metal patterns 121 and 122 including the inspection element group 30 to be the same as or similar to the pattern of the display area 110, it is possible to allow the shape or size of the defects 31, 32, 33, and 34 to be similar to those that may occur in the display area 110. The sealing portion metal patterns 121 and 122 may be formed together when other layer patterns such as data metal layers other than the bottom metal layer or gate metal layer are formed, and alternatively, the sealing portion metal patterns 121 and 122 may be formed both when the bottom metal layer or gate metal layer is formed and when the other layer patterns are formed. That is, as long as the inspection element group 30 may have a form similar to a defect that may occur in the display area 110 in consideration of the performing timing of the automatic optical inspection, the sealing portion metal patterns 121 and 122 may be formed on any layer. Since the sealing portion metal patterns 121 and 122, as shown in FIG. 8, remain under the sealant even after the display device is completely manufactured, when the inspection element group 30, which is the defects 31, 32, 33, and 34 intentionally formed in the sealing portion metal patterns 121 and 122, is present, it can be confirmed that the present embodiment is applied. This will be described with reference to FIG. 8.

FIG. 8 illustrates a cross-sectional view of a display device manufactured by forming an inspection element group for verifying detection ability of an automatic optical inspection according to an embodiment in a metal pattern of a sealing portion.

Referring to FIG. 8, a substrate SUB is disposed. The substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. The substrate SUB may be a rigid substrate, or a flexible substrate that is bendable, foldable, or rollable. The buffer layer SUB may be single-layered or multi-layered. The substrate SUB may be a substrate in which at least one base layer which include polymer resins sequentially stacked, and at least one inorganic layer, are alternately stacked.

The bottom metal layer BML including the sealing portion bottom metal pattern 121 is disposed on the substrate SUB. The bottom metal layer BML may include aluminum (Al), silver (Ag), magnesium (Mg), gold (Au), nickel (Ni), chromium (Cr), calcium (Ca), molybdenum (Mo), titanium (Ti), tungsten (W), and/or copper (Cu), and a metal oxide, and may have a single-layered or multi-layered structure including them. The sealing portion bottom metal pattern 121 is disposed even in the sealant formation area S, and the inspection element group 30 for verifying the detection ability of the automatic optical inspection may be disposed in the sealing portion bottom metal pattern 121 of the sealant formation area S.

A buffer layer BUF is disposed on the bottom metal layer BML. The buffer layer BUF may include a silicon oxide ($SiO_x$), a silicon nitride ($SiN_x$), a silicon oxynitride ($SiO_xN_y$), or an amorphous silicon (Si).

The buffer layer BUF may define a first opening OP1 overlapping the bottom metal layer BML of the display area A in a plan view. A first SD electrode SE may be connected to the bottom metal layer BML through the first opening OP1.

A semiconductor layer ACT is disposed on the buffer layer BUF. The semiconductor layer ACT may include an oxide semiconductor. The oxide semiconductor may include at least one of indium (In), tin (Sn), zinc (Zn), hafnium (Hf), and aluminum (Al). For example, the semiconductor layer ACT may include an indium-gallium-zinc oxide ("IGZO").

The semiconductor layer ACT may include a channel area CA overlapping a gate electrode GE, and a first area SA and a second area DA disposed at opposite sides of the channel area.

A gate insulation film GI is disposed on the semiconductor layer ACT in the display area A and on the buffer layer BUF in the sealant formation area S. The gate insulation film GI may include a silicon oxide ($SiO_x$), a silicon nitride ($SiN_x$), or a silicon oxynitride ($SiO_xN_y$), and may have a single-layered or multi-layered structure including the same.

The gate insulation film GI of the display area A may be disposed to overlap the channel area CA of the semiconductor layer ACT in a plan view. The gate conductive layer including the gate electrode GE and the sealing portion gate metal pattern 122 may be disposed on the gate insulation film GI. The inspection element group 30 for verifying the detection ability of an automatic optical inspection is disposed in the sealing portion gate metal pattern 122 of the sealant formation area S.

The gate electrode GE may include molybdenum (Mo), aluminum (Al), copper (Cu), titanium (Ti), and a metal oxide, and may have a single-layered or multi-layered structure including the same. The gate conductive layer may be formed in the same process as the gate insulation film GI to have the same planar shape. The gate electrode GE may be disposed to overlap the semiconductor layer ACT in a direction perpendicular to a surface of the substrate SUB.

An interlayer insulation film ILD may be disposed on the semiconductor layer ACT and the gate conductive layer. The interlayer insulation film ILD may include a silicon oxide ($SiO_x$), a silicon nitride ($SiN_x$), or a silicon oxynitride ($SiO_xN_y$), and may have a single-layered or multi-layered structure including the same. When the interlayer insulation film ILD has a multi-layered structure including a silicon nitride and a silicon oxide, a layer including the silicon nitride may be disposed closer to the substrate SUB than a layer including the silicon oxide.

The interlayer insulation film ILD may define a first opening OP1 overlapping the bottom metal layer BML, a second opening OP2 overlapping the first area SA of the semiconductor layer ACT, and a third opening OP3 overlapping the second area DA in a plan view.

A data conductive layer including a first SD electrode SE and a second SD electrode DE is disposed on the interlayer insulation film ILD. The data conductive layer may include aluminum (Al), silver (Ag), magnesium (Mg), gold (Au), nickel (Ni), chromium (Cr), calcium (Ca), molybdenum (Mo), titanium (Ti), tungsten (W), and/or copper (Cu), and a metal oxide, and may have a single-layered or multi-layered structure including them.

The first SD electrode SE may contact the bottom metal layer BML through the first opening OP1, and may contact the first area SA of the semiconductor layer ACT through the second opening OP2. The second SD electrode DE may contact the second area DA of the semiconductor layer ACT through the third opening OP3.

An insulation film VIA is disposed on the data conductive layer. The insulation film VIA may include an organic insulation material such as a general purpose polymer such as poly(methyl methacrylate) ("PMMA") or polystyrene ("PS"), a polymer derivative having a phenolic group, an acryl-based polymer, an imide-based polymer, a polyimide, and a siloxane-based polymer.

The insulation film VIA may define a fourth opening OP4 overlapping the first SD electrode SE. A first electrode 191 is disposed on the insulation film VIA. A partition wall layer 350 is disposed on the insulation film VIA and the first electrode 191. The partition wall layer 350 defines an opening 355 overlapping the first electrode 191 in a plan view. An emission layer 360 may be disposed within the opening 355. A second electrode 270 may be disposed on the partition wall layer 350 and the emission layer 360. The first electrode 191, the emission layer 360, and the second electrode 270 may form a light emitting element LED. The first electrode 191, the emission layer 360, and the second electrode 270 forming the light emitting element LED may be disposed only in the display area A, not in the sealant formation area S.

An encapsulation layer 380 including a plurality of insulation layers may be disposed on the second electrode 270 and the partition wall layer 350. The encapsulation layer 380 may include both an inorganic insulation material layer and an organic insulation material layer.

A filling layer 390 containing a filler and a sealant 500 surrounding and confining the filling layer 390 may be disposed on the encapsulation layer 380. A cover layer 400 including an insulation material, and a plurality of color conversion layers 430 may be disposed on the filling layer 390 and the sealant 500. The plurality of color conversion layers 430 may include different semiconductor nanocrystals. The semiconductor nanocrystals may include at least one of phosphor and quantum dot materials that convert incident first color light into second color light or third color light. Here, the quantum dot may control a color of emitted light according to a particle size thereof, and thus the quantum dot may have various light emitting colors such as blue, red, and green colors.

An insulation layer 440 may be disposed on the plurality of color conversion layers 430, and a plurality of color filters 450 and a light blocking member 460 may be disposed thereon. The color conversion layer 430 and the color filter 450 may be disposed only in the display area A, and may not be disposed in the sealant formation area S.

The light blocking member 460 may be disposed between adjacent color filters 450 and in the sealant formation area.

A substrate 210 may be disposed on the plurality of color filters 450 and the light blocking member 460. That is, the plurality of color conversion layers 430 and the plurality of color filters 450 may be disposed between the substrate SUB and the substrate 210.

According to another embodiment, without including the plurality of color conversion layers 430, the emission layer 360 may include quantum dots.

As described above, since the sealing portion metal patterns 121 and 122 remain under the sealant even after the display device is completely manufactured, when the inspection element group 30 for verifying the detection ability of the automatic optical inspection, that is, the defects 31, 32, 33, and 34 that are intentionally formed are included in the sealing portion metal patterns 121 and 122, it can be found that the present embodiment is applied.

Figure 9:
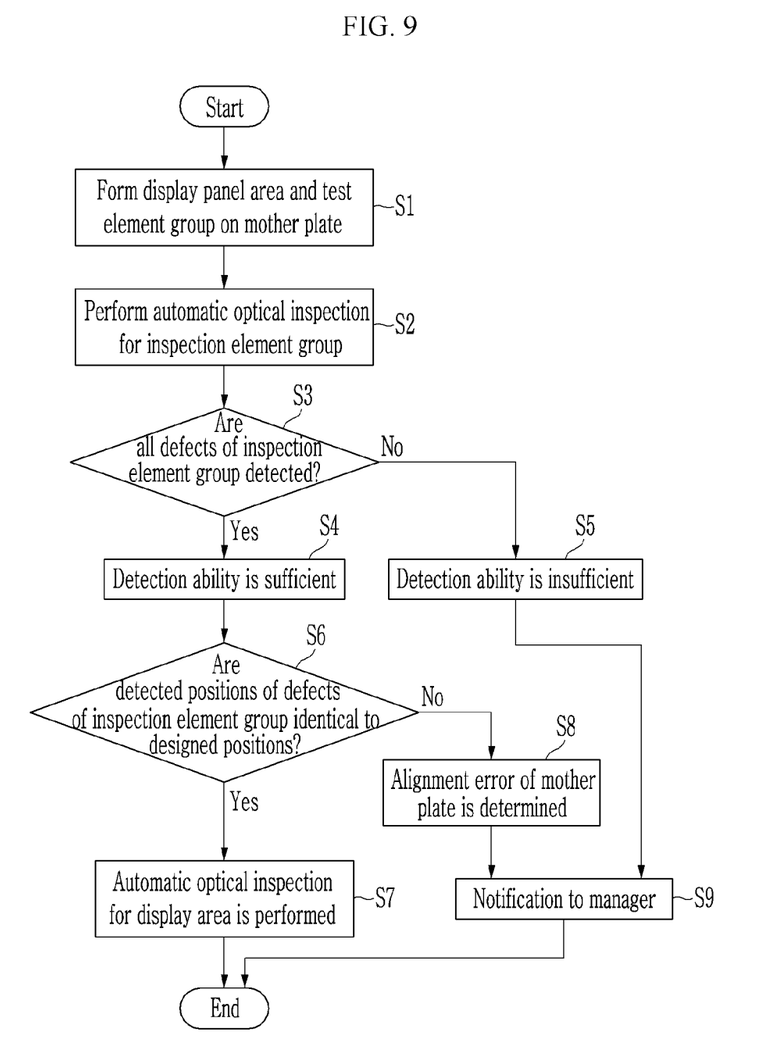
FIG. 9 illustrates a flowchart of a method for verifying detection ability of an automatic optical inspection according to an embodiment.

FIG. 9 illustrates a flowchart of a method for verifying detection ability of an automatic optical inspection according to an embodiment.

The verification of the detection ability of the automatic optical inspection according to an embodiment proceeds as follows.

First, an inspection element group including a plurality of display panel areas and a plurality of defects is formed on a mother plate (S1), and then an automatic optical inspection is performed on the inspection element group (S2).

In results of the automatic optical inspection for the inspection element group, after it checks whether all the defects included in the inspection element group are detected (S3), when all the defects are detected, it is determined that the detection ability of the automatic optical inspection is sufficient (S4), while when all the defects are not detected, it is determined that the detection ability of the automatic optical inspection is insufficient (S5). When it is determined that the detection ability is insufficient, it is notified to a manager so that the problem may be solved (S9).

When it is determined that the detection ability is sufficient, it checks whether the detected positions of the plurality of defects included in the inspection element group are identical to the designed positions (S6), and when they are identical to each other, the automatic optical inspection for the display area is performed (S7), while when they are not identical to each other, it is determined as an alignment error of the mother plate (S8). In another embodiment, the automatic optical inspection for the display area may be simultaneously performed with the automatic optical inspection for the inspection element group. In this case, it is determined whether to trust the inspection result for the display area according to the inspection result for the inspection element group.

The above verification process may be performed by an automatic optical inspection system including an optical detection device such as the cameras 30 in FIG. 1, a memory storing the designed positions, and a microprocessor which determines at least the S3 and S6 steps, and generates signals indicating the results of the determinations.

As described above, it is possible to secure reliability of the automatic optical inspection by checking the detection ability and alignment state in real time during the automatic optical inspection, and when a problem occurs in the automatic optical inspection equipment, it is possible to prevent yield reduction and to improve productivity by immediately taking action.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 10 mother plate
11 display panel area
20 camera
12 inspection element group
31 island defect
32 open defect
33 short circuit defect
34 pinhole defect
100 display panel
110 display area
120 sealant formation area
121, 122 sealing portion metal pattern

What is claimed is:

1. A display panel comprising
a substrate including a display area in which elements used for display are disposed and a peripheral area, and
an inspection element group disposed in the peripheral area of the substrate,
wherein the inspection element group includes defects that are repeatedly disposed.

2. The display panel of claim 1, wherein
the inspection element group is disposed in an area in which a sealant of the peripheral area is disposed.

3. The display panel of claim 2, wherein
the defect included in the inspection element group includes at least one of an island, an opening, a short circuit, and a pinhole.

4. The display panel of claim 3, wherein
the area in which the sealant is disposed has a rectangular ring shape with four sides, and the inspection element group is disposed on one of the four sides of the area in which the sealant is disposed.

5. The display panel of claim 3, wherein
the area in which the sealant is disposed has a rectangular ring shape with four sides, and the inspection element group is formed on all the four sides of the area in which the sealant is disposed.

6. The display panel of claim 1, wherein
the defect included in the inspection element group includes an island, an opening, a short circuit, and a pinhole.

7. The display panel of claim 6, wherein
the area in which a sealant is disposed has a rectangular ring shape with four sides, and the inspection element group is disposed on one of the four sides of the area in which the sealant is disposed.

8. The display panel of claim 6, wherein
the area in which the sealant is disposed has a rectangular ring shape with four sides, and the inspection element group is disposed on all the four sides of the area in which the sealant is disposed.

9. The display panel of claim 1, wherein
the inspection element group has a same pattern as an element formation pattern disposed in the display area except for additionally including the defect.

\* \* \* \* \*